3,636,091
NOVEL 9-CARBOXYMETHYL - 9-PHOSPHABICY-CLONONANES AND ALKALI METAL SALTS THEREOF
Ronald F. Mason, Mill Valley, and Wilhelm Keim, Berkeley, Calif., assignors to Sun Oil Company, New York, N.Y.
No Drawing. Filed Nov. 5, 1969, Ser. No. 874,375
Int. Cl. C07f 9/50
U.S. Cl. 260—514 R         4 Claims

ABSTRACT OF THE DISCLOSURE 9-carboxymethyl-9-phosphabicyclononanes and alkali metal salts thereof, useful as ligands of organometallic olefin oligomerization catalysts, are produced by the direct condensation of the sec-phosphine 9-phosphabicyclononane and a haloacetic acid.

BACKGROUND OF THE INVENTION

Field of the invention

It is well known in the art that tertiary phosphines and phosphine-containing transition metal compounds are useful as catalysts for a variety of chemical transformations. However, it is also well known that the utility of any particular class of phosphine in a chemical reaction depends in large part upon the nature and properties of the particular class of phosphines employed. For example, U.S. 3,444,208, of McClure, common assignee, issued May 13, 1969, describes the facile dimerization of vinyl ketones with triaryl phosphines as catalyst. In contrast, McClure discloses that the reaction of vinyl ketones in the presence of trialkylphosphine results in the formation of polymeric material. Similarly, U.S. 3,400,163, of Mason and Van Winkle, common assignee, issued Sept. 3, 1968, describes a novel class of monophosphabicycloalkanes, e.g., 9-hydrocarbyl - 9 - phosphabicycle(3.3.1)nonanes, which provide metal-phosphine complexes which are highly improved catalysts for the hydroformylation of olefins.

Description of the prior art

Phosphinoalkanoic acids, such as dicyclohexylphosphinoacetic acid, have been produced by condensing a sec-phosphine, e.g., dicyclohexylphosphine, with a halo-ester, e.g., ethyl chloroacetate, as disclosed by Issleib and Thomas, Ber. 94, 2244 (1961). The resulting phosphinoalkanoate ester is hydrolyzed to obtain the phosphinoalkanoic acid.

SUMMARY OF THE INVENTION

It has now been found that 9-carboxymethyl-9-phosphabicyclononanes and the alkali metal salts thereof are obtained by condensation of a 9-phosphabicyclononane and a haloacetic acid. For example, the condensation of the sec-phosphine 9-phosphabicyclo(3.3.1)nonane and chloroacetic acid followed by treatment with a base produces 9-carboxymethyl-9-phosphabicyclo(3.3.1)nonane.

DESCRIPTION OF PREFERRED EMBODIMENTS

The 9-carboxymethyl-9-phosphabicyclononanes and the alkali metal salts thereof are represented by the Formula I

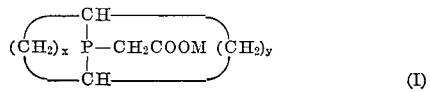

(I)

wherein M is hydrogen or alkali metal, $x$ is a whole number from 3 to 4 inclusive, and $y$ is a whole number from 2 to 3 inclusive selecetd so that the sum of $x$ and $y$, i.e., the term $(x+y)$, is 6. When M is hydrogen, Formula I represents the 9-carboxymethyl-9-phosphabicyclononanes of the invention. When M is alkali metal, Formula I represents the alkali metal salts of the novel phosphinoacids. M is a Group I-A metal of atomic number 3 through 55, inclusive, i.e., lithium, sodium, potassium, rubidium and cesium, but preferably is lithium, sodium and potassium; most preferred is sodium and potassium.

It will be apparent from consideration of the above Formula I that the novel phosphinoacids and their derivatives exist in two isomeric forms. More particularly, these isomeric forms are represented by the formulas

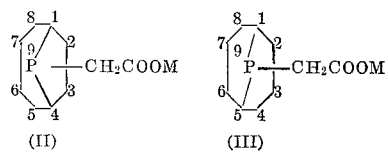

(II)         (III)

wherein the added numerals illustrate one conventional method of indicating the relative positions of the atoms present. It should be appreciated that the above-depicted atoms 1-8 are carbon atoms wherein all non-indicated valences are satisfied by bonding to hydrogen substituents.

Compounds of Formula II are 9-carboxymethyl-9-phosphabicyclo(4.2.1)nonane and its alkali metal salts, e.g., the sodium salt of 9-carboxymethyl-9-phosphabicyclo(4.2.1)nonane. Compounds of Formula III are 9-carboxymethyl-9-phosphabicyclo(3.3.1)nonane and its alkali metal salts, e.g., the potassium salt of 9-carboxymethyl-9-phosphabicyclo(3.3.1)nonane.

The 9-carboxymethyl-9-phosphabicyclononanes are produced by the condensation of the corresponding secondary phosphine, i.e., 9-phosphabicyclo(3.3.1)nonane, 9-phosphabicyclo(4.2.1)nonane, or mixture thereof, and a haloacetic acid, e.g., chloroacetic acid, bromoacetic acid or iodoacetic acid, in an inert reaction diluent at elevated temperatures, e.g., about 50° C. to 150° C., followed by treatment with a base. A satisfactory condensation procedure is that described by Issleib and Thomas, Ber. 94, 2244 (1961). The alkali metal salts of the 9-carboxymethyl-9-phosphabicyclononanes are prepared by treating the phosphonium halide condensation intermediate for the phosphinoacid with two or more equivalents of base or by neutralizing the isolable phosphinoacid with an alkali metal oxide or hydroxide solution. The novel compounds of the invention are useful as ligands or organometallic olefin polymerization catalysts, particularly for the oligomerization of ethylene to a mixture of oligomeric products which are highly linear in character and predominately alpha-olefins.

EXAMPLE I

A solution of 47.3 g. of chloroacetic acid in 350 ml. of benzene was mixed with a solution of 71 g. of 9-phosphabicyclo(3.3.1)nonane in 160 ml. of t-butyltoluene under an atmosphere of nitrogen. The inert nitrogen atmosphere was maintained and the resulting reaction mixture was stirred and slowly heated to reflux. After one hour under reflux (temperature 90° C.) the mixture was allowed to cool overnight during which time solid 9-carboxymethyl-9-phosphoniabicyclo(3.3.1)nonane chloride, alternatively named 9-carboxymethylbicyclo(3.3.1)nonyl-9-phosphonium chloride, precipitated. The solid phosphonium chloride salt was removed by filtration, washed with benzene and dried in a vacuum oven. The crude phosphonium chloride product weighed 110 g. A sample of the phosphonium chloride product was recrystallized from boiling ethanol to afford pure 9-carboxymethyl-9-phosphoniabicyclo(3.3.1)nonane chloride, M.P. 303–305° C. (sealed tube). Elemental analysis of the pure phosphonium chloride salt gave the following results:

Calcd. for $C_{10}H_{18}ClO_2P$ (percent wt.): C, 50.7; H, 7.7; Cl, 15.0; P, 13.1. Found (percent wt.): C, 50.4; H, 7.8; Cl, 14.9; P, 13.2.

A 59.2 g. sample of the crude phosphonium chloride product was dissolved in 250 ml. of 50% deaerated aqueous methanol under a nitrogen atmosphere. A solution of 42.8 ml. of 6 N sodium hydroxide was added slowly to the methanol solution. The resulting solution was then evaporated at 60° C. under reduced pressure and the residue was subsequently dried at 60° C. over phosphorus pentoxide. The residue was extracted with ether in a vapor jacketed Soxhlet extractor under an atmosphere of nitrogen. The ether extract deposited 18.1 g. of 9-carboxymethyl-9-phosphabicyclo(3.3.1)nonane, M.P. 131–132° C. Elemental analysis of the 9-carboxymethyl-9-phosphabicyclo(3.3.1)nonane gave the following results:

Calcd. for $C_{10}H_{17}O_2P$ (percent wt.): C, 60.0; H, 8.6; P, 15.5. Found (percent wt.): C, 60.0; H, 8.5; P, 15.6.

Concentration of the ether extract afforded an additional 24.5 g. of 9-carboxymethyl-9-phosphabicyclo(3.3.1)nonane.

EXAMPLE II

By a procedure similar to that of Example I, a sample of 9 - (2 - carboxyethyl)-9-phosphabicyclo(3.3.1)nonane was prepared by (1) reaction of 3-bromopropionic acid and 9-phosphabicyclo(3.3.1)nonane to produce 9-(2-carboxyethyl) - 9-phosphoniabicyclo(3.3.1.)nonane bromide and (2) subsequently neutralizing the phosphonium bromide salt with 1 equivalent of sodium hydroxide to produce the 9-(2-carboxyethyl)-9-phosphabicyclo(3.3.1) nonane product.

EXAMPLE III

By a procedure similar to that of Example I, a sample of 9 - (3-carboxypropyl)-9-phosphabicyclo(3.3.1)nonane was prepared by (1) reaction of 4-bromobutyric acid and 9-phosphabicyclo(3.3.1)nonane to produce 9-(3-carboxypropyl)-9-phosphoniabicyclo(3.3.1)nonane bromide and (2) subsequently neutralizing the phosphonium bromide salt with 1 equivalent of sodium hydroxide to produce the 9 - (3 - carboxypropyl) - 9-phosphabicyclo(3.3.1)nonane product.

EXAMPLE IV

An oligomerization catalyst was prepared by contacting in 90 ml. of benzene at 25° C. 1.71 millimoles of bis-1,5-cyclooctadienenickel-(O) and 1.71 millimoles of each of the 9-carboxyalkyl-9-phosphabicyclo-nonanes identified in Table I below. The resulting benzene catalyst solution was then contacted with ethylene maintained at a constant pressure of 550 p.s.i.g. in a stirred autoclave. The reaction conditions and results are provided in Table I.

TABLE I

| Experiment | A | B | C |
|---|---|---|---|
| Reaction conditions: | | | |
| Time, hours | 4 | 4 | 4 |
| Temperature, ° C | 75 | 75 | 75 |
| Ethylene pressure, p.s.i.g | 550 | 550 | 550 |
| Phosphine ligand | (1) | (2) | (3) |
| Percent weight nickel | 0.14 | 0.14 | 0.14 |
| Gram oligomer product/gram Ni/hour | 32.5 | 15.7 | 5.8 |
| Product distribution—oligomers, percent wt.: | | | |
| $C_4$ | 22.7 | 63.2 | 40.2 |
| $C_6$ | 21.4 | 25.9 | 30.4 |
| $C_8$ | 16.6 | 7.2 | 14.7 |
| $C_{10}$ | 12.8 | 2.2 | 6.1 |
| $C_{12}$ | 9.6 | 0.9 | 3.7 |
| $C_{14}$ | 7.2 | 0.4 | 2.6 |
| $C_{16}$ | 4.7 | 0.1 | 1.3 |
| $C_{18}$ | 3.0 | | 1.0 |
| $C_{20}$ | 1.6 | | |
| $C_{22}$ | 0.5 | | |
| Linearity, straight chain olefins, percent | 99.6 | 98.4 | 94.9 |
| Terminal olefins, Z-olefins, percent | 94.0 | 93.4 | 81.8 |
| Polyethylene, percent weight | 0 | 0 | 0 |

[1] 9-carboxymethyl-9-phosphabicyclo (3.3.1)nonane.
[2] 9-(2-carboxyethyl)-9-phoshabicyclo (3.3.1)nonane.
[3] 9-(3-carboxypropyl)-9-phosphabicyclo (3.3.1)nonane.

Experiment A utilizes as phosphine ligand 9-carboxymethyl-9-phosphabicyclo(3.3.1)nonane, a compound of the invention. Experiments B and C, for comparative purposes, utilize as phosphine ligands compounds that are closely related structurally to the carboxymethyl compound of the invention. The data in Table I demonstrate that for producing oligomer product the oligomerization catalyst containing the carboxymethyl compound of the invention as ligand is more than twice as active as the catalyst containing the 2-carboxyethyl compound and almost six times as active as that containing the 3-carboxypropyl compound. From the catalyst containing the carboxymethyl ligand of the invention is obtained a superior distribution of oligomer products, particularly in the desirable $C_{10}$–$C_{20}$ alpha-olefin product range.

We claim as our invention:

1. Compounds of the formula

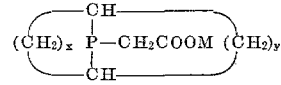

wherein M is hydrogen or alkali metal, $x$ is a whole number from 3 to 4 inclusive, and $y$ is a whole number from 2 to 3 inclusive and the sum of $x + y$ is 6.

2. Compound of claim 1 wherein M is hydrogen, $x$ is 4 and $y$ is 2.

3. Compound of claim 1 wherein M is hydrogen, $x$ is 3 and $y$ is 3.

4. Compounds of claim 1 wherein M is sodium or potassium.

References Cited

Issleib et al.: Chem. Ber., 94, 2244 (1961).

LORRAINE A. WEINBERGER, Primary Examiner

R. GERSTT, Assistant Examiner

U.S. Cl. X.R.

252—430; 260—683.15

PO-1050
(5/69)

UNITED STATES PATENT OFFICE
CERTIFICATE OF CORRECTION

Patent No. 3,636,091            Dated January 18, 1972

Inventor(s) RONALD F. MASON and WILHELM KEIM

It is certified that error appears in the above-identified patent and that said Letters Patent are hereby corrected as shown below:

In the front page, left column, seventh line, "Sun" should read -- Shell --.

Signed and sealed this 30th day of May 1972.

(SEAL)
Attest:

EDWARD M. FLETCHER, JR.
Attesting Officer

ROBERT GOTTSCHALK
Commissioner of Patents